United States Patent [19]

Stadler et al.

[11] Patent Number: 5,013,575
[45] Date of Patent: May 7, 1991

[54] PROCESS FOR PRODUCING A CARAMELIZED NUT PRODUCT

[75] Inventors: Edwin Stadler, Anif Nr., Austria; Wolfgang Hergesell, Markt Schellenberg, Fed. Rep. of Germany; Ernst Pidner, Anthering, Austria

[73] Assignee: Jacobs Suchard AG, Zurich, Switzerland

[21] Appl. No.: 317,812

[22] Filed: Mar. 1, 1989

[30] Foreign Application Priority Data

Mar. 1, 1988 [DE] Fed. Rep. of Germany ....... 3806471

[51] Int. Cl.$^5$ .......................... A23G 3/00; A23G 7/00; A23P 1/00
[52] U.S. Cl. .................................... 426/639; 426/516; 426/659; 426/660
[58] Field of Search .................. 426/93, 103, 639, 615, 426/659, 516, 660; 99/353, 450.7; 127/22

[56] References Cited

U.S. PATENT DOCUMENTS

| | | |
|---|---|---|
| 3,543,696 | 12/1970 | Peedal . |
| 3,584,585 | 6/1971 | Hansel . |
| 4,054,271 | 10/1977 | Lanzillo . |
| 4,098,914 | 7/1978 | Knechtel . |
| 4,138,271 | 2/1979 | Ohira et al. .................. 127/DIG. 1 |

FOREIGN PATENT DOCUMENTS

| | | |
|---|---|---|
| 0175160 | 8/1985 | European Pat. Off. . |
| 0247926 | 5/1987 | European Pat. Off. . |
| 1367452 | 3/1963 | France . |
| 2109086 | 5/1972 | France . |
| 2228436 | 12/1974 | France . |

OTHER PUBLICATIONS

Meiners, A.; Kreiten, K.; & Joike, H., Das Neu Handbuch der Subwarenindustrie, Bd. 1983, S. 193.
Lebensmittelindustrie 30, 1983, H. 9, S. 391–396.
Kunststoffe, pp. 69–71.

Primary Examiner—Donald E. Czaja
Assistant Examiner—Mary S. Mims
Attorney, Agent, or Firm—Burns, Doane, Swecker & Mathis

[57] ABSTRACT

A process for producing a product made of a mixture of sugar and an ingredient including nuts in a heated screw extruder includes the steps of feeding the sugar into the screw extruder at a first intake zone, caramelizing the sugar by conveying the sugar through several caramelization zones which are heated, feeding the nuts to the screw extruder through a second intake zone, and mixing the caramelized sugar with the nuts by conveying the caramelized sugar and the nuts through one or more mixing zones. During the mixing steps, the nuts can be roasted. Also, the temperature in the mixing zones and the caramelization zones may be such that the temperature decreases from one zone to the next in the direction of conveyance of the mixture.

18 Claims, 1 Drawing Sheet

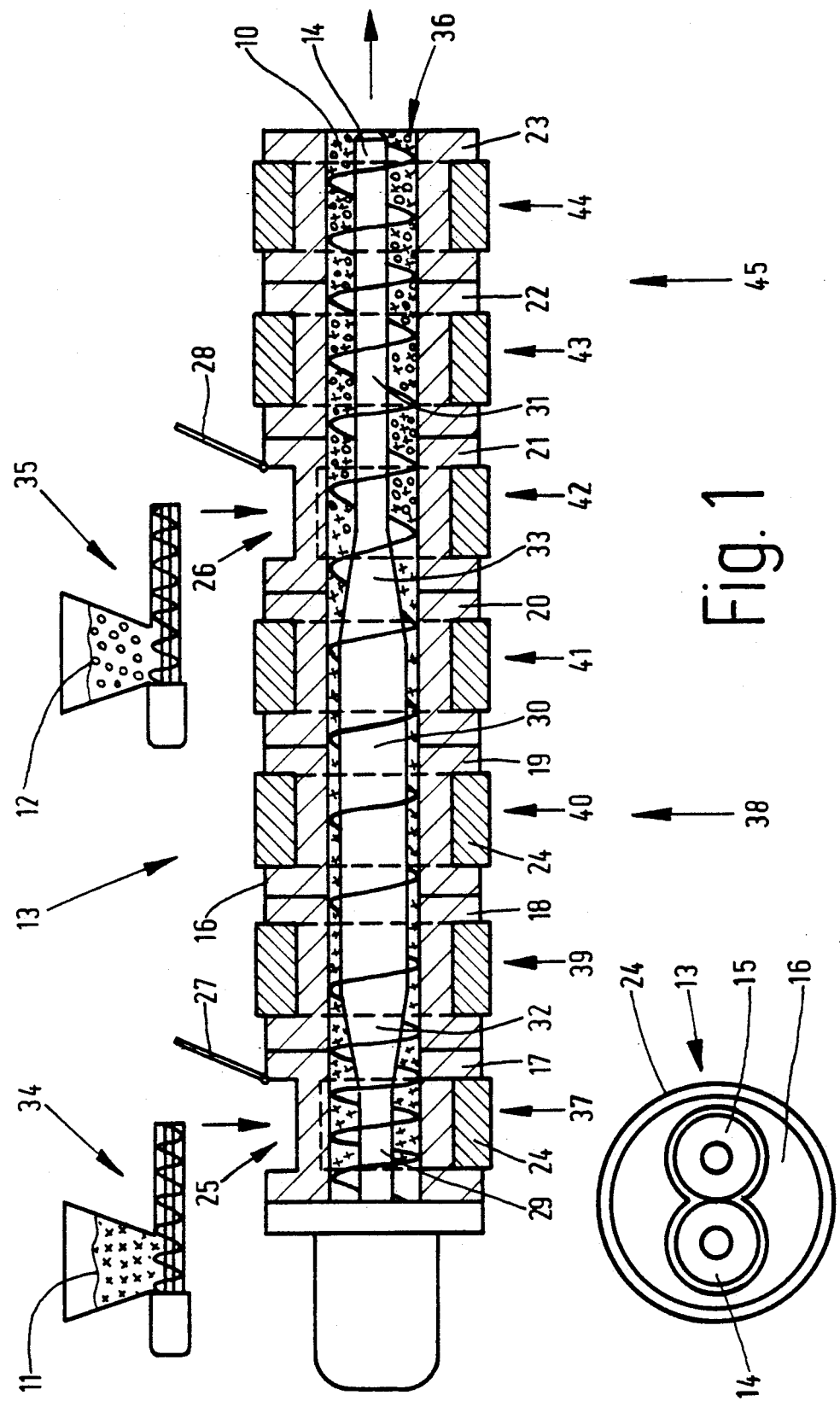

PROCESS FOR PRODUCING A CARAMELIZED NUT PRODUCT

FIELD OF THE INVENTION

The invention relates to a process for producing fruit kernel caramel from a mixture of nuts and/or possibly other ingredients and sugar and/or sugar alcohol with heating, in such a way that the sugar is caramelised and the nuts and/or other ingredients are roasted. The invention also relates to equipment for carrying out the process.

BACKGROUND OF THE INVENTION

The taste of nuts and/or other ingredients caramel is essentially determined by the course of the melting process for converting sugar into caramelised sugar. If the sugar is exposed to the temperature stress for too long or if the temperature is too high, at least partial overheating takes place, which leads to the formation of bitter substances in the product.

Using the processes hitherto known, the production of caramelized products having a homogeneous degree of caramelisation is not possible, because of various disadvantages inherent in the process. In a batch process, the parameters which influence the degree of caramelisation are not exactly reproducable. Moreover, even with thorough mixing of the sugar, ranges of different temperature result in the batch, which adversely affect the quality of the product. Admittedly, a known continuous production process provides an advance over the batch process, since most of the production parameters can be kept constant. Even here, however, it is not ensured that all the regions of the sugar are exposed to a uniform temperature stress adapted to the progress of the caramelisation process.

OBJECTS AND SUMMARY OF THE INVENTION

It is the object of the invention to provide a process and equipment for producing caramelized nut products, wherein the latter can be produced with a homogeneous, constant degree of caramelisation.

To achieve this object, the process according to the invention is characterised in that the mixture or the constituents thereof is or are continuously conveyed through a heated screw machine, in particular a screw extruder.

The use of a screw extruder ensures inevitable, continuous conveying of the mixture. Different residence times of part regions of the mixture in the conveying path are not possible.

The novel process also allows icing sugar to be caramelised which, under non-uniform heating, tends to agglomerate, so that it was not possible to use it in the existing production processes. Icing sugar has the advantage over granular sugar that, due to its smaller particle diameter, more rapid melting is achieved. Moreover, as a result of the use of icing sugar, a greater surface area is available for binding the fruit aroma substances released during the roasting process, when only the sugar surface is melted.

The process takes place along a conveying path which is formed by the screw and barrel of the extruder The mixture here passes through seven zones which are held at different temperatures by means of individual heating elements. For charging the extruder with sugar and nuts, for example, two mutually spaced intake zones are provided, sugar being filled into the first intake zone (sugar intake zone) and the nuts being filled into the second intake zone (nut intake zone). The sugar intake zone and nut intake zone are at temperatures of about 160° C. and about 150° C. respectively. In addition, the nuts are already preheated outside the extruder to a temperature of about 50° C.

Three caramelisation zones, which form a caramelisation region and in which the caramelisation of the sugar takes place, are provided between the sugar intake zone and the nut intake zone. For this purpose, the three caramelisation zones are at temperatures which decrease in the direction of conveyance, in particular about 220° C. in the first, about 190° C. in the second and about 160° C. in the third caramelisation zone.

Downstream of the nut intake zone, the caramelised sugar and nuts are mixed with one another in two mixing zones forming a mixing region. Here, roasting of the nuts takes place at the same time. The temperatures of the mixing zones likewise decrease in the direction of conveyance and are about 130° C. in the first mixing zone and about 120° C. in the second mixing zone.

The screw of the screw extruder is at least partially heated, in particular to a temperature of about 140° C.

To obtain a greater aroma density, the nuts can be comminuted before they are filled into the screw extruder.

The equipment according to the invention for carrying out the process consists of the conveying path, subdivided into seven conveying sections (zones), of a screw extruder, each zone being provided with an independently operating heating element. In the region of the sugar intake zone and nut intake zone, the barrel of the screw extruder is provided with filling ports which can be closed. For controlled the feeding of the sugar and/or the nuts a metering device or a mixing/metering device is allocated to each intake zone.

For adapting the conveying conditions to the course of the process, the screw exhibits different geometries in the various regions of the conveying path.

Further details of the invention relate to the sectionally variant design of the screw.

Alternatively, the screw extruder can also be fitted with two screws which can be driven in the same direction or in opposite directions with intermeshing or mutually adjoining profiles.

BRIEF DESCRIPTION OF THE DRAWING FIGURES

Details of the process according to the invention and of the equipment are explained in more detail below by reference to an illustrative embodiment represented in the drawing, in which:

FIG. 1 shows a twin-screw extruder with metering devices, in longitudinal section, and FIG. 2 shows a side view of the twin-screw extruder according to FIG. 1.

DETAILED DESCRIPTION OF THE PREFERRED EMBODIMENTS

The individual process steps necessary for producing caramelized nut products will be explained in more detail by reference to the twin-screw extruder illustrated in FIGS. 1 and 2. By way of example, the process for producing flowable hazelnut caramel for the manufacture of nougat masses is described here. The object of the process is to produce a caramelized hazelnut product which, is distinct from the caramelized product produced by the conventional processes, can be processed directly further without having to pass, before further processing, through diverse comminution units for producing a flowable product.

The constituents of the mixture 10 for producing flowable hazelnut caramel are icing sugar 11 and finely comminuted hazelnuts 12. The process is carried out in a twin-screw extruder 13 with screws 14 and 15 which run in opposite directions and are accommodated in a common barrel 16.

The barrel 16 is subdivided into seven barrel sections 17, 18, 19, 20, 21, 22 and 23; these can be formed as individual part barrels which, when assembled, form the barrel 16, or they can merely describe regions of the integral barrel 16. The barrel sections 17..23 are provided with heating elements 24 which allow independent temperature control of the individual barrel sections 17..23 and hence the setting of defined temperature profiles in the direction of conveyance.

The barrel sections 17 and 21 have filling ports 25 and 26, which can be closed by means of covers 27 and 28.

The screws 14 and 15 of the twin-screw extruder 13 have different geometries in the region of certain barrel sections 17..23. In the region of the barrel section 17, the screws 14 and 15 have, in their initial section 29, a small core cross-section and a large number of flights. By contrast, in the region of the barrel sections 18, 19, 20, they have, in their central section 30, a large core cross-section and a small number of flights. Finally, in their end section 31, in the region of the barrel sections 21, 22 and 23, they are characterised by a small core cross-section and a medium number of flights, measured relative to the numbers of flights in the initial section 29 and in the central section 30. In the transition regions 32 and 33 from the initial section 29 to the central section 30 and from the central section 30 to the end section 31, respectively, there is always a steady transition of the core cross-sections and of the numbers of flights.

Above each of the filling ports 25 and 26 in the barrel 16 of the twin-screw extruder 13, a metering device 34 or 35 respectively is provided.

In this process for producing caramelized hazelnut products, the mixture 10 and the icing sugar 11 are conveyed continuously along a conveying path 36 formed by the barrel 16 and the screws 14 and 15 of the twin-screw extruder 13. The conveying path 36 is subdivided into certain zones or regions corresponding to the various process steps proceeding in different ways.

In a sugar intake zone 37 of the conveying path 36 in the region of the barrel section 17, the icing sugar 11 is fed through the filling ports 25 into the twin-screw extruder 13 by means of the metering device 34 at a constant rate per unit time. In order to avoid blockages in the sugar intake zone 37, the temperature of the barrel section 17 must be below the melting point of the icing sugar 11; it is about 160° C. The geometry of the screws 14 and 15 in the region of the sugar intake zone 37 is selected such that the icing sugar 11 is conveyed into the barrel 16 without backflow being possible.

The sugar intake zone 37 is adjoined downstream by a caramelisation region 38, which is formed by three caramelisation zones 39, 40 and 41 in the region of the barrel sections 18, 19 and 20 and in which the icing sugar 11 is caramelised. The temperatures in the barrel sections 18, 19 and 20 concerned and the geometries of the screws 14 and 15 in the caramelisation region 38 are selected such that the temperature in the melt is as homogeneous as possible, so that a uniform degree of caramelisation of the icing sugar 11 results. For producing caramelized hazelnut products, the temperature profile set in the caramelisation region 38 is characterised by the following temperatures, decreasing in the direction of conveyance, of the barrel sections 18, 19 and 20: about 220° C. in the barrel section 18, about 190° C. in the barrel section 19 and about 160° C. in the barrel section 20. Lowering or raising of the temperature level leads, respectively, to inadequate caramelisation of the icing sugar 11 or to an increase in the degree of caramelisation, an unduly high degree of caramelisation leading to the formation of bitter substances and hence to a bitter taste of the product. A prerequisite for uniform caramelisation of the icing sugar 11 is, in addition to precise setting of the temperature profile, the smallest possible radial temperature gradient in the caramelised icing sugar 11. Accordingly, the geometry of the screws 14 and 15 in the caramelisation region 38 is selected such that a large surface-to-volume ratio results for the caramelised icing sugar 11.

The caramelisation region 38 is followed in the region of the barrel section 21 by a nut intake zone 42, in which finely comminuted hazelnuts 12 are fed by means of the metering device 35 through the filling port 25 to the twin-screw extruder 13. In the nut intake zone 42, the temperature in the barrel section 21 is lowered to 150° C., in order to preclude further browning of the icing sugar 11 which has been previously caramelised. The finely comminuted hazelnuts 12 themselves are preheated to 50° C., in order to prevent undue cooling of the mixture 10 formed in the nut intake zone 42 from caramelised icing sugar 11 and hazelnuts 12. In the fruit intake zone 42, the core cross-section of the screws 14 and 15 is considerably reduced again, so that the total volume, which has been increased by feeding the hazelnuts 12, can be taken up.

The last process step in the production of caramelized hazelnut products is characterised by uniform thorough mixing of the mixture 10, with simultaneous roasting of the finely comminuted hazelnuts 12 in the mixing region 45 formed by two mixing zones 43 and 44 in the region of the barrel sections 22 and 23. The temperatures in the respective barrel sections 22 and 23 are about 130° C. and about 120° C. and are selected such that, on the one hand, they are sufficiently high for roasting of the hazelnuts 12 and, on the other hand, the temperature at the discharge of the mixture 10 at the end of the conveying path 36 is at most 110° C., in spite of the heating of the screws 14 and 15 to about 140° C. This is intended to ensure that there is no further uncontrolled roasting of the hazelnuts 12.

The indicated temperatures in the individual barrel sections 17..23 in the production of flowable caramelized hazelnut products are applicable only for the following sizing of the other production parameters:
Feeding of icing sugar 11 and finely comminuted hazelnuts 12: 80 kg/hour
Temperature of the screws 14 and 15: 140° C.
Speed of rotation of the screws 14 and 15: 50 rpm
Effective length of the screws 14 and 15: 140 cm
Residence time of the icing sugar 11 in the twin-screw extruder 13: about 2 minutes.

Adhering to the above temperatures for the individual barrel sections 17..23 ensures that the icing sugar 11, consisting of fine particles, always incipiently melts only at the surfaces of these particles, so that the result of the production process is a flowable caramelized hazelnut product which is of high quality, because it has a very light colour.

It is, of course, also possible to provide additional cooling elements on the twin-screw extruder 13, in addition to the heating elements 24, or to provide other extruder designs, if appropriate in order to allow more rapid control or greater sudden temperature changes along the conveying path 36.

We claim:

1. A process for producing a product made of a mixture of sugar and an ingredient that includes nuts in a heated screw extruder, comprising the steps of:
   feeding the sugar into the screw extruder through a first intake zone;
   caramelizing the sugar by conveying the sugar along a conveying path in the screw extruder through a plurality of caramelization zones which are heated by a heating means;
   adding said ingredient to the caramelized sugar in the screw extruder through a second intake zone, said second intake zone being spaced from said first intake zone; and
   mixing the caramelized sugar with said ingredient and roasting said ingredient by conveying the caramelized sugar and said ingredient along the conveying path.

2. The process according to claim 1, wherein said mixture includes icing sugar.

3. The process according to claim 1, wherein said sugar is sugar alcohol.

4. The process according to claim 1, wherein said sugar is conveyed along the conveying path through seven zones, each of which is heated to a different temperature.

5. The process according to claim 1, wherein the sugar is fed into the first intake zone when the first intake zone is at a temperature of about 160° C. and wherein said ingredient is fed into the second intake zone when the second intake zone is at a temperature of about 150° C.

6. The process according to claim 1, including the step of preheating said ingredient to a temperature of about 50° C. prior to conveying said ingredient into the screw extruder.

7. The process according to claim 4, wherein the sugar is conveyed through three caramelization zones which decrease in temperature in the direction of conveyance of the sugar.

8. The process according to claim 7, wherein the sugar is conveyed through a first caramelization zone which is heated to a temperature of about 220° C., through a second caramelization zone which is located downstream from the first caramelization zone with respect to the direction of conveyance of the sugar and which is heated to a temperature of about 190° C., and through a third caramelization zone which is located downstream from the second caramelization zone with respect to the direction of conveyance of the sugar and which is heated to a temperature of about 160° C.

9. The process according to claim 4, wherein the mixing step includes conveying said ingredient and the caramelized sugar through two mixing zones of the screw extruder which decrease in temperature with respect to the direction of conveyance of the caramelized sugar and said ingredient.

10. The process according to claim 9, wherein said ingredient and the caramelized sugar are conveyed through a first mixing zone heated to a temperature of about 130° C. and through a second mixing zone with respect to the direction of conveyance and which is heated to a temperature of about 120° C.

11. The process according to claim 1, wherein the screw extruder includes a screw and including the step of heating the screw to a temperature of approximately 140° C.

12. The process according to claim 1, including the steps of comminuting said ingredient prior to conveying it into the screw extruder to obtain a greater aroma density of said ingredient.

13. The process according to claim 1, wherein the sugar is conveyed through three caramelization zones which decrease in temperature in the direction of conveyance of the sugar.

14. The process according to claim 1, wherein the sugar is conveyed through a first caramelization zone which is heated to a temperature of about 220° C., through a second caramelization zone which is located downstream from the first caramelization zone in the direction of conveyance of the sugar and which is heated to a temperature of about 190° C., and through a third caramelization zone which is located downstream from the second caramelization zone with respect to the direction of conveyance of the sugar and which is heated to a temperature of about 160° C.

15. The process according to claim 1, wherein said ingredient and the caramelized sugar are conveyed through two mixing zones of the screw extruder which decrease in temperature with respect to the direction of conveyance.

16. The process according to claim 15, wherein said ingredient and the caramelized sugar are conveyed through a first mixing zone heated to a temperature of about 130° C. and through a second mixing zone located downstream from the first mixing zone with respect to the direction of conveyance and which is heated to a temperature of about 120° C.

17. The process according to claim 1, wherein said mixing and caramelizing steps are carried out in a screw extruder having two screws extending therethrough.

18. The process according to claim 1, wherein said mixing and caramelizing steps are carried out in a screw extruder having a screw extending therethrough and having a plurality of different zones of different temperatures, the geometrical shape of said screw being different in some of the zones.

* * * * *

UNITED STATES PATENT AND TRADEMARK OFFICE
CERTIFICATE OF CORRECTION

PATENT NO.   :   5,013,575
DATED        :   May 7, 1991
INVENTOR(S)  :   STADLER ET AL.

It is certified that error appears in the above-identified patent and that said Letters Patent is hereby corrected as shown below:

In column 6, line 12, after "zone" insert --which is located downstream from the first mixing zone--.

Signed and Sealed this

Fifteenth Day of December, 1992

*Attest:*

DOUGLAS B. COMER

*Attesting Officer*   Acting Commissioner of Patents and Trademarks